United States Patent
Lefaudeux et al.

(10) Patent No.: US 11,028,992 B2
(45) Date of Patent: Jun. 8, 2021

(54) OPTICAL SYSTEM FOR A PIXELIZED LIGHT BEAM

(71) Applicant: VALEO VISION, Bobigny (FR)

(72) Inventors: Nicolas Lefaudeux, Bobigny (FR); Antoine De Lamberterie, Bobigny (FR); Guillaume Thin, Bobigny (FR); Samira Mbata, Bobigny (FR); Thomas Canonne, Bobigny (FR); Van Thai Hoang, Bobigny (FR); Vincent Dubois, Bobigny (FR); Francois-Xavier Amiel, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/333,921

(22) PCT Filed: Sep. 11, 2017

(86) PCT No.: PCT/EP2017/072741
§ 371 (c)(1),
(2) Date: Mar. 15, 2019

(87) PCT Pub. No.: WO2018/050594
PCT Pub. Date: Mar. 22, 2018

(65) Prior Publication Data
US 2019/0264885 A1  Aug. 29, 2019

(30) Foreign Application Priority Data
Sep. 15, 2016 (FR) .................................... 16 58644

(51) Int. Cl.
*F21S 8/00* (2006.01)
*G02B 17/06* (2006.01)
(Continued)

(52) U.S. Cl.
CPC ............ *F21S 41/365* (2018.01); *F21S 41/141* (2018.01); *F21S 41/155* (2018.01); *F21S 41/36* (2018.01);
(Continued)

(58) Field of Classification Search
CPC ........ F21S 41/365; F21S 41/36; F21S 41/141; G02B 17/06; B60Q 2400/50
See application file for complete search history.

(56) References Cited

U.S. PATENT DOCUMENTS

2001/0010632 A1* 8/2001 Futami .................. F21S 41/255
                                                                362/297
2002/0191161 A1   12/2002 Baba et al.
(Continued)

FOREIGN PATENT DOCUMENTS

AT       2015/033764       3/2015
CN       104670074 A       6/2015
(Continued)

OTHER PUBLICATIONS

Combined Chinese Office Action and Search Report dated Sep. 2, 2020 in Chinese Patent Application No. 201780057017.2 (with English translation), 15 pages.
(Continued)

*Primary Examiner* — Karabi Guharay
(74) *Attorney, Agent, or Firm* — Oblon, McClelland, Maier & Neustadt, L.L.P.

(57) ABSTRACT

A luminous device for a motor vehicle, said device including a pixelized light source and an optical system that is arranged to project a pixelized light beam emitted by the pixelized light source, the optical system comprising a first mirror arranged to collect and reflect rays of the pixelized light beam emitted by the pixelized light source, a second mirror arranged to reflect the rays reflected by the first
(Continued)

mirror, and a third mirror arranged to receive the rays reflected by the second mirror and to reflect these received rays so as to correct field aberrations. The invention enables improved projection of a pixelized light beam by a luminous motor-vehicle device.

19 Claims, 4 Drawing Sheets

(51) Int. Cl.
| | | |
|---|---|---|
| F21S 41/365 | (2018.01) | |
| F21S 41/141 | (2018.01) | |
| F21S 41/675 | (2018.01) | |
| F21S 41/155 | (2018.01) | |
| G03B 29/00 | (2021.01) | |
| F21S 43/31 | (2018.01) | |
| F21S 41/36 | (2018.01) | |
| G03B 21/28 | (2006.01) | |
| F21Y 115/10 | (2016.01) | |
| B60Q 1/50 | (2006.01) | |

(52) U.S. Cl.
CPC .............. *F21S 41/675* (2018.01); *F21S 43/31* (2018.01); *G02B 17/0642* (2013.01); *G03B 21/28* (2013.01); *G03B 29/00* (2013.01); *B60Q 1/50* (2013.01); *B60Q 2400/50* (2013.01); *F21Y 2115/10* (2016.08)

(56) References Cited

U.S. PATENT DOCUMENTS

| | | |
|---|---|---|
| 2007/0085980 A1 | 4/2007 | Lerner et al. |
| 2007/0263304 A1 | 11/2007 | Sakagami et al. |
| 2012/0038812 A1 | 2/2012 | Neil |
| 2014/0307459 A1* | 10/2014 | Brendle ............... F21S 41/635 |
| | | 362/520 |
| 2015/0156448 A1 | 6/2015 | Lee |
| 2017/0253172 A1* | 9/2017 | Canonne ............. B60Q 1/0023 |
| 2017/0305332 A1 | 10/2017 | Albou et al. |

FOREIGN PATENT DOCUMENTS

| | | |
|---|---|---|
| DE | 10 2004 026 993 A1 | 12/2005 |
| JP | 2001-042461 A | 2/2001 |
| JP | 2004-207235 A | 7/2004 |
| JP | 2006-285044 A | 10/2006 |
| JP | 2008-145703 A | 6/2008 |
| JP | 2012-99228 A | 5/2012 |
| WO | WO 2011/077988 A1 | 6/2011 |
| WO | WO 2016/050503 A1 | 4/2016 |

OTHER PUBLICATIONS

Japanese Office Action dated Jan. 19, 2021 in Japanese Patent Application No. 2019-514259 with English translation, 16 pages.

* cited by examiner

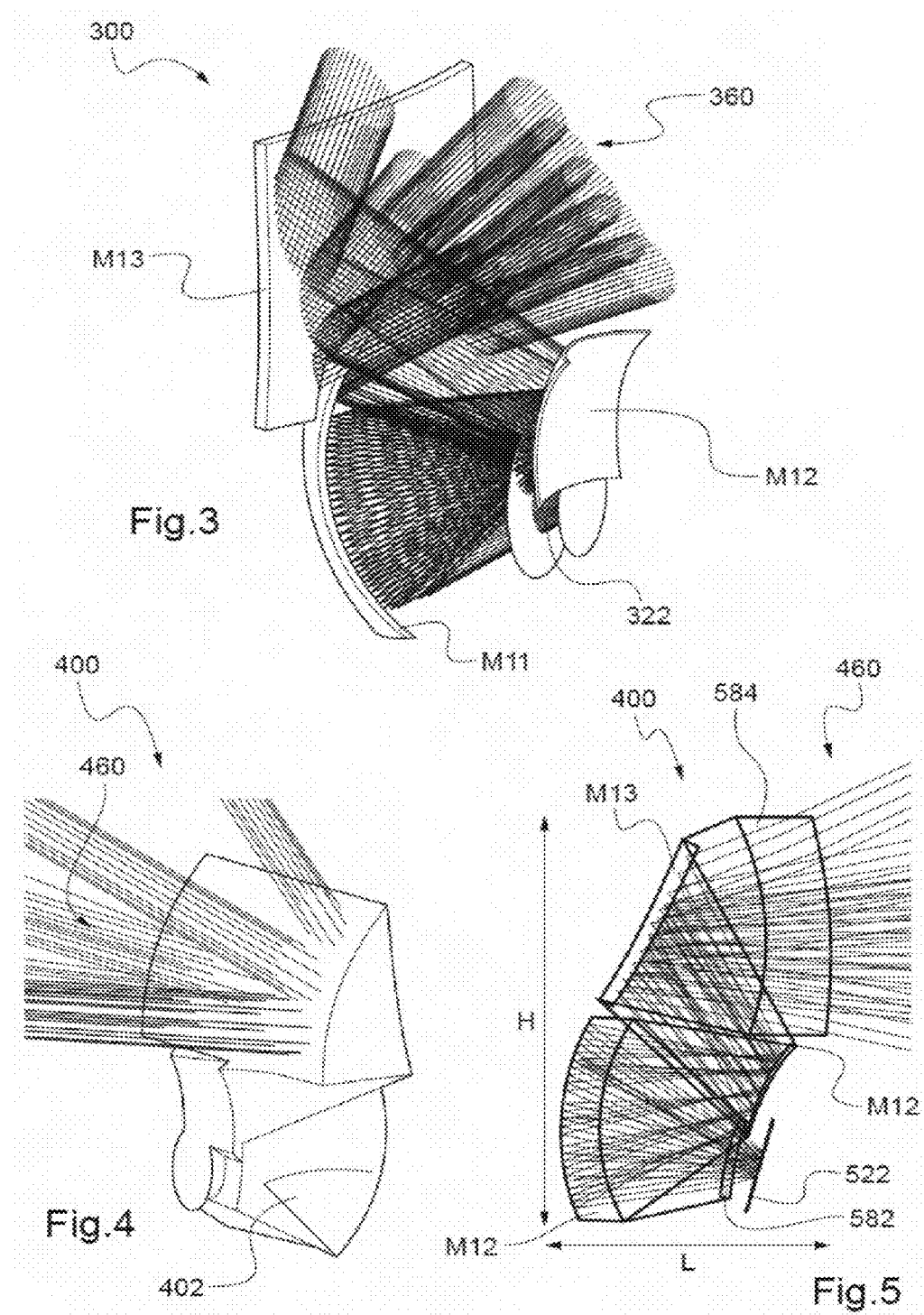

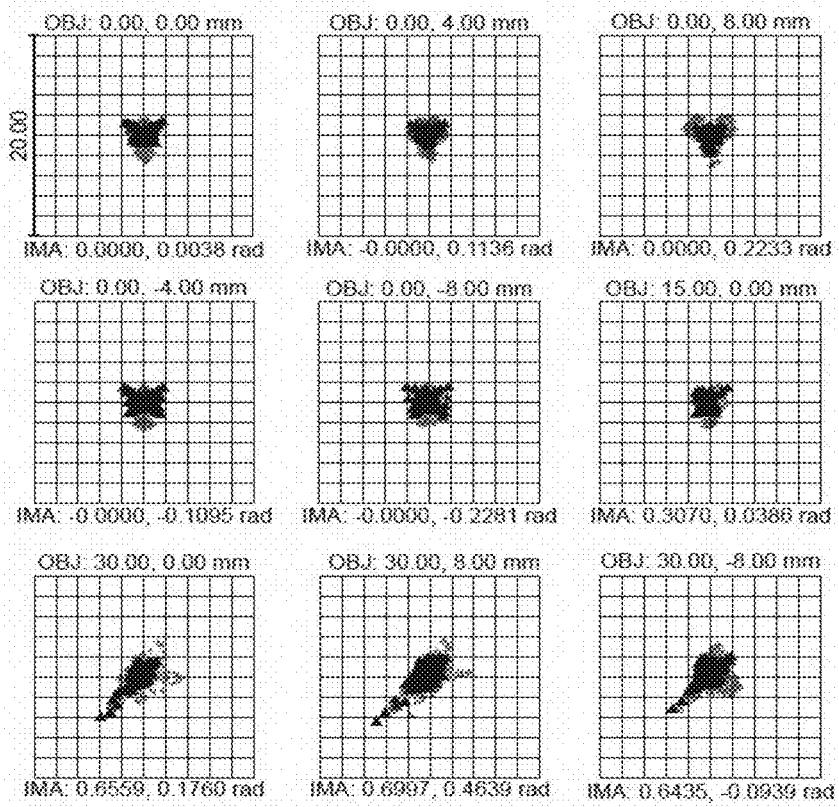

Fig.6

| provision of a setpoint for the distribution of light to be produced by the projection of the pixelized light beam | S10 |

| determination of a distribution of light intensities over the pixelized light source corresponding to the setpoint and compensating for a distortion of the distribution of light by the optical system | S20 |

| emission, by the pixelized light source, of a pixelized light beam having the determined distribution of light intensities | S30 |

| projection, by the optical system, of the pixelized light beam emitted by the light source | S40 |

FIG. 7

OPTICAL SYSTEM FOR A PIXELIZED LIGHT BEAM

FIELD OF THE INVENTION

The invention relates to the field of projection of a pixelized light beam by a luminous motor-vehicle device.

BACKGROUND

The projection of a light beam by a luminous motor-vehicle device conventionally allows the road to be illuminated with an overall illumination and thus visibility to be increased in case of darkness, for example at night. This allows the vehicle to be safely driven.

Recent developments in the field of these luminous devices allow a pixelized light beam to be produced with a view to achieving this illumination. With such a light beam, the luminous device may also perform localized lighting functions, and for example project a pattern onto the scene. Such functions are known in the field of adaptive lighting. Glare-free lighting, which for example consists in darkening a zone corresponding to an oncoming vehicle in order not to dazzle this other user, is for example known. The lighting-based driver aid that consists, for example, in increasing the brightness with which markings on the ground or road signs are lit so that they are more visible to the driver and/or in projecting onto the road one or more pieces of information that are visible to the driver is also known.

In this context, there is a need to improve the projection of a pixelized light beam by a luminous motor-vehicle device.

SUMMARY OF THE INVENTION

To this end, a method for projection of a pixelized light beam by a luminous motor-vehicle device, and a luminous motor-vehicle device configured to execute the method, are provided.

The luminous device includes a pixelized light source and an optical system that is arranged to project a pixelized light beam emitted by the pixelized light source. The optical system comprises at least three mirrors. The first mirror is arranged to collect and reflect most of the rays of the pixelized light beam emitted by the pixelized light source. The second mirror is arranged to reflect the rays reflected by the first mirror. The third mirror is arranged to reflect the rays reflected by the second mirror so as to correct field aberrations.

Such a luminous device improves the projection of a pixelized light beam by a luminous motor-vehicle device.

This luminous device is a technology for projection of a pixelized light beam. Such a light beam allows, by virtue of its pixelized character, one or more patterns to be projected when it is so desired.

This architecture of at least three mirrors, at least one of which corrects the field aberrations of the optical system, is similar to that of three-mirror-anastigmat (TMA) telescopes. Just like the optical system of such TMAs, the optical system is achromatic or at least relatively weakly chromatic (by virtue of the use of mirrors). Furthermore, the optical system may prevent or at least decrease field aberrations.

For these reasons, compared to the optical systems of existing luminous motor-vehicle devices, the optical system is able to produce high-resolution pixelized light beams while generating a haze that remains of the order of magnitude of one pixel. This differentiates the optical system from the optical systems presently used in the automotive field, which generate a haze of a dimension that is often larger than that of one pixel, at least at high resolutions. Haze designates the spread of the points to be projected. When an optical system generates a haze, this decreases the effectiveness and resolution of the luminous device. This loss of quality is particularly disadvantageous when it is desired to project fine patterns, with pixels of relatively small size. The proposed optical system therefore allows a luminous motor-vehicle device that is able to effectively project a high-resolution pixelized light beam of good quality to be obtained.

Unlike the optical systems of TMAs, the function of which is to collect astronomical images, the optical system is suitable not only for projection of a pixelized light beam, but also for projection of a pixelized light beam emitted by the pixelized light source of a luminous motor-vehicle device. Thus, the projection field (i.e. the maximum angle of the projected light beam) of the optical system is relatively large (in order to allow it to illuminate the road adequately) and the dimensions of the optical system relatively small (in order to allow it to be integrated into a luminous motor-vehicle device, which itself must be integrated into a motor-vehicle light).

The method for projection of a pixelized light beam by the luminous device comprises provision of a setpoint for the distribution of light to be produced by the projection of the pixelized light beam. The method also comprises determination of a distribution of light intensities over the pixelized light source corresponding to the setpoint and compensating for a distortion of the distribution of light by the optical system. The method also comprises emission by the pixelized light source of a pixelized light beam having the determined distribution of light intensities. Furthermore, the method comprises projection by the optical system of the pixelized light beam emitted by the light source.

A computer program comprising program-code instructions for the execution of the method is also provided. The method is executed when said program is executed by a control unit for controlling projection of a pixelized light beam by a luminous motor-vehicle device such as above, the luminous device also including the control unit coupled to the pixelized light source.

Such a control unit is also provided. The control unit includes a processor associated with a memory storing the program.

A motor-vehicle light including a luminous device such as above is also provided.

According to various embodiments, any combination of at least one of the following features may be implemented:
 the first mirror is arranged to directly collect and reflect most of the rays of the pixelized light beam emitted by the pixelized light source; in other words, the first mirror directly receives the rays of the pixelized light beam emitted by the pixelized light source and reflects them, without an intermediate optical element being inserted between the pixelized light source and the first mirror;
 the first mirror is arranged to indirectly collect and reflect most of the rays of the pixelized light beam emitted by the pixelized light source, i.e. an optical element is inserted between the pixelized light source and the first mirror, this not changing the collecting role of the first mirror;
 the second mirror is arranged to directly or indirectly reflect the rays reflected by the first mirror;

the third mirror is arranged to directly or indirectly reflect the rays reflected by the second mirror;

the third mirror is also arranged to collimate and project the pixelized light beam;

the luminous device furthermore includes an optical means arranged to receive the rays reflected by the third mirror and to collimate and project the pixelized light beam;

the second mirror is arranged substantially in pupil position;

at least one of the mirrors is off-axis;

at least one of the mirrors is a free-form mirror;

at least two of the mirrors or all the mirrors are free-form mirrors;

the optical system has a hollow architecture;

the optical system has a monolithic architecture;

the optical system forms a single solid part, for example produced in a block of transparent material;

the optical system comprises an entrance face and an exit face;

the optical system furthermore includes at least three other faces forming the first, second and third mirrors;

the exit face ensures or participates in the collimation;

the entrance face and/or the exit face is arranged to correct field aberrations;

the optical system has at least one of the following features (for example all the following features): a projection-field height larger than 10°, a projection-field width larger than 40°, a collecting power (f/D) lower than 3, a resolving power lower than 0.5° (i.e. an angular value higher than) 0.5° at least in a zone at the center of the projection field, and/or a largest dimension smaller than 300 millimeters; and/or the luminous device furthermore includes a control unit including a processor associated with a memory storing a computer program comprising program-code instructions for the execution of a method comprising: provision of a setpoint for the distribution of light to be produced by the projection of the pixelized light beam; determination of a distribution of light intensities over the pixelized light source corresponding to the setpoint and compensating for a distortion of the distribution of light by the optical system; emission, by the pixelized light source, of a pixelized light beam having the determined distribution of light intensities; and projection, by the optical system, of the pixelized light beam emitted by the light source.

BRIEF DESCRIPTION OF THE FIGURES

Various embodiments of the invention will now be described, by way of completely nonlimiting example, with reference to the appended drawings, in which:

FIGS. 3-5 show examples of the optical system;

FIG. 6 shows the results of simulations;

FIG. 7 shows a chart illustrating one example of the method;

DETAILED DESCRIPTION

Figure 1:
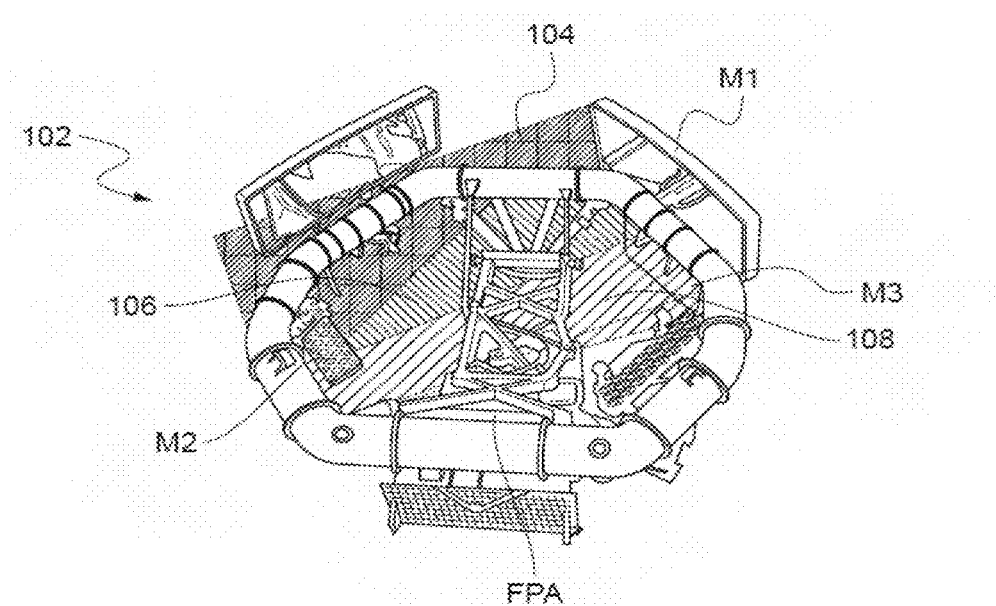
FIGS. 1-2 illustrate a prior-art TMA optical system.
Figure 2:
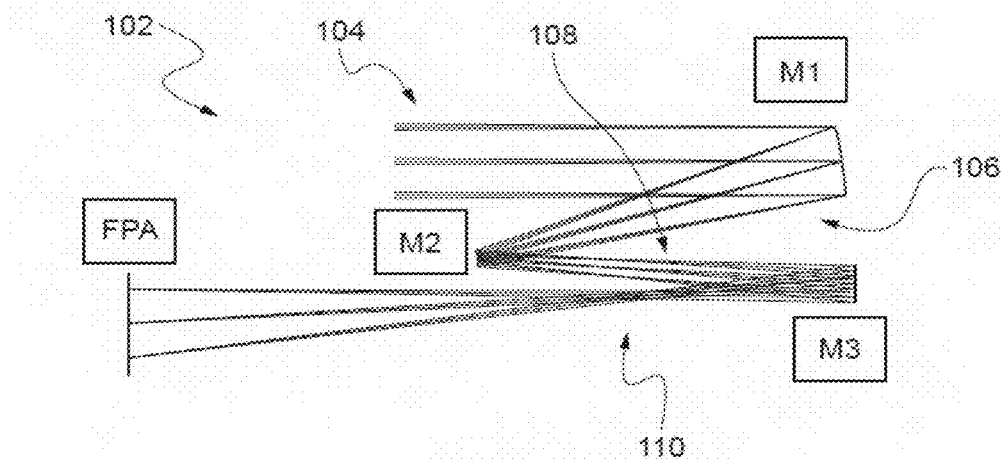

FIG. 1 shows a prior-art TMA optical system 102 of a telescope. FIG. 2 schematically illustrates the operation of the optical system 102.

In operation, a first mirror M1 is arranged to collect and reflect rays 104 of the light beam emitted by a celestial object and to correct field aberrations. The rays 104 are parallel because of the distance of the celestial object. A second mirror M2 is arranged to reflect the rays 106 reflected by the first mirror M1. A third mirror M3 is arranged to receive the rays 108 reflected by the second mirror M2 and to project the resulting rays 110 onto a focal plane array (FPA), which allows the image to be viewed and/or recorded. The field of view of the optical system 102 is rectangular and relatively narrow and the dimensions of the optical system 102 are relatively large. By virtue of its architecture (in particular the correction of field aberrations by the first mirror M1), the resolving power of the optical system 102 is particularly high. Thus, the optical system 102 is very suitable for observing celestial objects with a telescope. Document US 2012038812 A describes an example of an optical system operating in this way.

The proposed optical system has architectural similarities with the optical system 102. In particular, it also forms a system comprising a plurality of mirrors that may be anastigmatic (at least to a certain extent) provided that the mirrors are suitably arranged and configured (mirror form and surface properties) as well known in the field of TMAs. The mirrors are reflective surfaces, also called "reflectors". Thus, the optical system allows a very high resolving power to be obtained.

With respect to an optical system of a luminous motor-vehicle device that projects a pixelized light beam, resolving power designates the minimal angle that must separate two contiguous points for them to be discernible. Thus, the resolving power of an optical system corresponds to the finest resolution that it is possible to use to embed, into a pixelized light beam, detailed patterns that it is desired to be discernible. Below the resolving power, the detailed pattern is not discernible. Thus, with an optical system having a high resolving power, a luminous vehicle device that projects a pixelized light beam emitted by a pixelized light source may fully take advantage of all the resolution fineness delivered by the pixelized light source. The proposed optical system therefore allows advantage to be taken of a high-resolution pixelized light source, for example one that comprises more than 1000 pixels or more than 10,000 pixels.

Unlike the optical system 102, the proposed optical system does not comprise an FPA. In the overall arrangement of the luminous device, the FPA is replaced by a pixelized light source that emits a pixelized (e.g. nonparallel) light beam. Thus, the operation of the proposed optical system is inverted with respect to the prior-art optical system. With reference to FIG. 2, the first mirror encountered by the rays of the pixelized light beam corresponds to M3 in the optical system 102. This first mirror collects and reflects these rays toward a second mirror that corresponds to M2. The second mirror then reflects the rays toward a third mirror that corresponds to M1 and that corrects field aberrations.

Various examples of features of the proposed optical system will now be discussed.

The third mirror may be arranged to collimate and project the pixelized light beam, for example onto the road. Alternatively, the luminous device may furthermore comprise an optical means arranged to receive the rays reflected by the third mirror and to collimate and project the pixelized light beam. The optical means may for example directly receive the rays from the third mirror (without intermediate element). In these cases, the optical system may comprise exactly three and no more than three mirrors, as in the optical systems of TMAs. Its manufacture is therefore relatively simple. Alternatively, the optical system may comprise one or more other mirrors, for example a fourth or a fifth mirror.

The first mirror may be arranged to collect most of the rays of the pixelized light beam emitted by the pixelized light source. This allows the luminous device to be highly effective. The pixelized light beam emitted by the pixelized light source may have the shape of a cone. The first mirror may be suitably arranged. The first mirror may be concave.

The first mirror may produce most of the optical power of the optical system, for example almost all of the optical power. The first mirror may be arranged to participate in the correction of field aberrations (with the third mirror). The first mirror may also participate in the correction of spherical aberrations.

The position and form of the second mirror may be configured so that it receives all of the rays emitted by the pixelized light source that are reflected by the first mirror, and redirects these rays toward the third mirror, whatever their emission angle. This allows the effectiveness of the luminous device to be optimized.

The second mirror may be arranged substantially in pupil position. The pupil position corresponds to the telecentricity of the light rays level with the pixelized light source. This allows the effectiveness of the luminous device to be optimized.

At least one mirror may be off-axis. For example, all the mirrors may be off-axis. The use of off-axis mirrors makes it possible to avoid occulting some of the rays with the folding mirror and to improve the transmission of the system.

At least one of the mirrors may be a free-form mirror. For example, all the mirrors are free-form mirrors. A free-form mirror is a mirror that has a free-form, i.e. a profile without an axis of rotational symmetry. This distinguishes this type of mirror from spherical mirrors but also from the so-called aspherical mirrors used in conventional TMAs, i.e. mirrors that are not spherical but that are formed from at least one segment of a shape that has rotational symmetry. For a large-field system of high collecting power, the use of free-form surfaces allows the best performance in terms of resolving power, projection field and system compactness to be obtained.

The motor vehicle may be any type of land vehicle, for example an automobile (car), a motorcycle or a truck. The vehicle may be equipped with one or more front lights and/or one or more rear lights. One or more of the front and/or rear lights may each comprise one or more luminous devices each configured to project a pixelized light beam. The projection of a pixelized light beam is of particular interest when it is performed by a luminous device of a front light.

For a given luminous device, the projection may be carried out onto a scene. The scene or "road scene" is the environment of the vehicle capable of being illuminated by the luminous device.

A pixelized light beam is, as known, a light beam that is subdivided into elementary light sub-beams that are called "pixels". The subdivision may be of any type, and for example form a grid having an azimuthwise dimension and a depthwise dimension (or distance) with respect to the position of the vehicle. Each pixel is individually controllable by the luminous device to an extent allowing at least one pattern to be projected onto the scene. A pattern is a localized zone of the scene in which the value of the light intensity differs from the nominal value and creates a localized contrast in the scene. A pattern may be distinguishable or indistinguishable to the naked eye.

Each pixel of the pixelized light beam is projected onto a corresponding zone of the scene, which is also called "pixel". The luminous device may individually control the light intensity of the source of each pixel of the pixelized light beam in order thus to individually control the illuminance of each pixel of the scene. The luminous device may divide the scene into more than 10 pixels, more than 50 pixels, or, for a projection implementing advanced functions, more than 500 pixels (for example about 1000 pixels or more than 1000 pixels). The pixelized light beam may for example darken one or more groups of one or more pixels, and/or over-illuminate one or more groups of one or more pixels with respect to an in-use light intensity value, the nominal value for example. Darkening of a pixel is a decrease at a given time in the illuminance of the pixel. It will therefore be noted that the darkening of a pixel does not necessarily imply that the illumination of the pixel is stopped. An over-illumination of a pixel is an increase at a given time in the illuminance of the pixel. The contrast of the pattern with respect to its perimeter may therefore be positive or negative. The resolution of a pattern may be of the order of one pixel. The size of the pattern may be smaller than 25% or 10% of all of the pixels of the scene.

The size of the pattern may be equal to or larger than one pixel. For a given pattern projected at a given time, one or more pixels of the scene—or equivalently of the light beam—correspond to the pattern. In the pattern, a distribution of one or more respective light intensities is thus associated with each pixel and forms the pattern. A method may therefore project the pattern in a zone of the scene by providing the luminous device with a light-intensity setpoint that corresponds to the pattern, for each pixel in question of the scene. The light-intensity setpoint may be any light-intensity-related data structure, for example a light-intensity value to be applied at the center of the pixel, a spatial and/or temporal distribution of values to be applied for a given pixel, and/or data indirectly related to light intensity and able to be expressed in light intensity (for example data relating to the illuminance of the pixel). When the setpoint is respected by all the pixels corresponding to the pattern, the pattern is fully projected onto the scene. A plurality of patterns may be projected simultaneously, with or without spatial overlap. The case of a spatial overlap may be managed in any way. For example, one pattern may have priority over another. Alternatively, the luminous device may be configured to find a compromise in the illuminance to be applied in a pixel included in the overlap.

The projection of the pattern may improve a driving situation. A driving situation may correspond to a set of driving parameters, for example including environmental parameters and/or architectural parameters relating to the road, system parameters of the vehicle and/or other vehicles and/or parameters relating to the state of the road. The improvement may consist in a projection of the pattern, improving the comfort of and/or assisting the driver of the vehicle projecting the pattern and/or of other users (for example another driver of one or more other vehicles and/or one or more pedestrians). The projection of the pattern may accomplish this improvement by performing one or more of the following functions: a function for projection of information created for the attention of the driver and/or other users, a function for highlighting or increasing the brightness of one or more objects in the scene, and/or a function for preventing any person (for example one or more other users) from being dazzled. Such a pattern allows driving to be made easier and/or safety to be increased, from the point of view of the emitter vehicle and/or of other traffic at the instant at which the pattern is projected.

A pattern may perform the function of preventing another user or the driver from being dazzled by darkening a zone of the scene corresponding to this other user and/or a reflective sign. Thus, the luminous device may for example operate continuously in high-beam mode, the luminous device creating the darkened region as soon as an oncoming vehicle comes into range. This ensures a high level of driver comfort and of visibility and therefore increases safety.

A pattern may form an image projected onto the ground, for example onto the road. An image is a pattern that is visible, i.e. distinguishable, for example by the driver and/or other users. The image may perform one or more of the following functions: increase the brightness of markings on the ground (for example lines and/or arrows, for example by over-illumination so as to allow their contrast and therefore their visibility to be increased); highlight a verge of the road used by the vehicle; create a representation framing the road (for example when road markings are absent); create markings corresponding to the dimension of the vehicle (this allowing—if the steering-wheel angle is integrated—the path of the vehicle to be identified, thus forming an equivalent at the front to backup cameras); and/or display one or more pieces of information of any type providing assistance to the driver (for example regarding safety, hazards, or even driving-related data such as a speed or a direction).

The pattern may for example correspond to a localized zone that is better lit than the rest of the surrounding scene, and/or to a localized zone that is less brightly lit than the rest of the surrounding scene or not lit at all. In the case where the localized zone is on the road itself, the pattern may correspond to an illuminated localized zone. This allows the driver to continue to see the road even in the zone and thus road safety to be maintained. In the case where the pattern is for the attention of the driver of the vehicle, the pattern may correspond to a localized zone that is more brightly lit than the rest of the scene. This allows it to be made more visible to the driver. Furthermore, an outline of the pattern may be darkened. This further increases the contrast and therefore the visibility of the pattern. The pattern may for example form an image projected onto the road for the attention of the driver of the vehicle. In this case, a positive contrast of the pattern with respect to its perimeter allows a particularly good visualization to be achieved. In another example, the pattern may correspond to another (automotive or not) vehicle, for example an oncoming vehicle. In this case, the pattern may correspond to the location occupied by this other vehicle in the scene. A darkening involving a negative contrast of the pattern with respect to its perimeter allows this other user not to be dazzled and thus road safety to be ensured. Similarly, the pattern may correspond to the location occupied by a sign or another reflective object. A darkening of this object makes it possible to avoid reflections and thus to avoid dazzling the driver and/or other users.

A pixelized light beam may be projected by a luminous device including a pixelized light source. The light source may be able to interact with an optical system (integrated into the device or not) arranged to project, onto the road, a pixelized light beam emitted by the pixelized light source. The method may comprise projecting the pixelized light beam with such a luminous device. The same pixelized light source may emit both the overall illumination and the image. A pixelized light source is a light source that is divided into a plurality of light-source units that are individually controllable. Each pixel emitted by the pixelized light source, and therefore each light-source unit, may correspond to one pixel of the projected pixelized light beam. Thus, the light intensity of each pixel of the pixelized light source and therefore the illuminance of each pixel of the scene may be individually controlled. The pixelized light source may include more than 1000 pixels. The luminous device may thus project high-resolution patterns.

The pixelized light source may comprise an array of light-source units. The array may comprise a multitude of pixels in a plane. In the case of a light source comprising an array of pixels and interacting with an optical system, the optical system may have a focal zone that is coincident with the plane of the array of pixels, i.e. coincident with the pixelized light source.

The pixelized light source may be a DMD (digital micromirror device) in which rotational modulation of the micromirrors allows a desired light intensity in a given direction to be obtained. The pixelized light source may be an LCD (liquid-crystal display) comprising an areal light source in front of which liquid crystals are placed. The liquid crystals are able to move so as to permit or prevent the passage of light and thus the pixelized light beam to be formed. The pixelized light source may be of the type that employs a laser to send a beam of light rays to a scanning system that distributes it over the surface of a wavelength-converting device, such as a sheet containing a luminophore.

The pixelized light source may be an electroluminescent source. An electroluminescent source is a solid-state light source (solid-state lighting array) that comprises at least one electroluminescent element. Examples of electroluminescent elements include light-emitting diodes (LEDs), organic light-emitting diodes (OLEDs) or polymer light-emitting diodes (PLEDs). The pixelized light source may be a semiconductor light source. Each electroluminescent element or group of electroluminescent elements may form one pixel and may emit light when its or their material is supplied with electricity. The electroluminescent elements may each be semiconductor, i.e. they may each include at least one semiconductor.

The electroluminescent elements may mainly be made of semiconductor. It is therefore possible to speak of a luminous pixel when an electroluminescent element or group of electroluminescent elements forming one pixel of the pixelized light source emits light. The electroluminescent elements may be located on the same substrate, and for example be deposited on the substrate or obtained by growth and extend from the substrate. The substrate may be mainly made of semiconductor. The substrate may include one or more other materials, for example non-semiconductor materials.

The pixelized light source may be a monolithic semiconductor electroluminescent light source. The source may for example be a monolithic array of pixels. The light source may for example be a monolithic LED array. A monolithic array comprises at least 50 electroluminescent elements located on the same substrate (for example on the same face of the substrate), for example more than 100, 1000 or several thousand electroluminescent elements. The substrate may include sapphire and/or silicon. The pixels of the monolithic array may be separated from one another by lanes or streets. The monolithic array may therefore form a grid of pixels. A monolithic source is a source having a high density of pixels. The density of pixels may be higher than or equal to 400 pixels per centimeter squared ($cm^2$). In other words, the distance between the center of a first pixel and the center of a second pixel neighboring the first may be equal to or smaller than 500 microns (μm). This distance is also called pixel pitch.

In a first configuration, in particular corresponding to the case of a monolithic LED array, each of the electroluminescent elements of the array may be electrically independent from the others and emit or not light independently of the other elements of the array. Each electroluminescent element may thus form one pixel. Such a light source allows a high resolution to be achieved relatively simply.

In a second configuration, the electroluminescent elements have the general shape of "rods", for example of submillimeter-sized dimensions. The rods may each extend orthogonally to the substrate, have a general cylindrical shape, in particular of polygonal cross section, have a diameter comprised between 0.5 μm and 2.0 μm, and preferably of 1 μm, have a height comprised between 1 μm and 10 μm, and preferably of 8 μm, and/or have a luminance of at least 60 Cd/mm$^2$ and preferably of at least 80 Cd/mm$^2$. The distance between two immediately adjacent rods may be comprised between 3 μm and 10 μm and/or be constant or variable. The rods may be arranged to emit light rays along the rod (i.e. along a direction perpendicular to a main plane of extension of the substrate) and from the end thereof. The semiconductor may include silicon. The electroluminescent elements are distributed in various selectively activatable light-emitting zones, each pixel thus being formed by one selectively activatable zone. Such a pixelized light source has advantages with respect to bulk and lifetime, and to achieving very high resolutions.

The pixelized light source may be coupled to a control unit for controlling the light emission of the pixelized light source. The control unit may thus control (drive) the generation (for example the emission) and/or the projection of a pixelized light beam by the luminous device. The control unit may be integrated into the luminous device. The control unit may be mounted on the light source, this assembly thus forming a luminous module. The control unit may include a processor (or CPU, acronym of central processing unit) that is coupled to a memory in which a computer program that contains instructions allowing the processor to perform steps that generate signals allowing the light source to be controlled so as to execute the method is stored. The control unit may thus for example individually control the light emission of each pixel of one pixelized light source.

The control unit may form an electronic device able to control the electroluminescent elements. The control unit may be an integrated circuit. An integrated circuit, also called an electronic chip, is an electronic component that performs one or more electronic functions and that may incorporate several types of basic electronic components, for example in a small volume (i.e. on a small chip). This makes the circuit easy to implement. The integrated circuit may for example be an ASIC or an ASSP. An ASIC (acronym of application-specific integrated circuit) is an integrated circuit developed for at least one specific application (i.e. for a customer). Un ASIC is therefore a specialized (microelectronic) integrated circuit. In general, it has many unique or made-to-measure functionalities. An ASSP (acronym of application-specific standard product) is an integrated (microelectronic) electronic circuit having many functionalities for addressing an application that is generally standardized. An ASIC is designed for a more particular (specific) need than an ASSP. Electricity is supplied to the electroluminescent source, and therefore to the electroluminescent elements, via the electronic device, which itself is supplied with electricity for example using at least one connector that connects it to a source of electricity. The electronic device thus supplies the electroluminescent elements with electricity. The electronic device is thus able to control the electroluminescent elements.

Various examples of the optical system will now be discussed with reference to FIGS. 3-5.

The optical systems 300, 400 of the examples each comprise a first mirror M11 arranged to collect and reflect rays of the pixelized light beam emitted by the pixelized light source, a second mirror M12 arranged to reflect the rays reflected by the first mirror, and a third mirror M13 arranged to receive the rays reflected by the second mirror and to reflect these rays so as to correct field aberrations. In these examples, the second mirror M2 is arranged substantially in pupil position and receives all the rays reflected by the first mirror M11. The first mirror M11, the second mirror M12 and the third mirror M13 are free-form mirrors. The first mirror M11 is concave. In these examples, the optical system does not comprise any other mirror. The following discussions however also apply in other cases, and in particular in the case where the optical system comprises one or more other mirrors.

In a first configuration shown in FIG. 3, the optical system 300 has a hollow architecture. In this example, M11, M12 and M13 are all separate. Provision could be made, as a variant, for a single hollow structure. Each group or each mirror may be held in the luminous device independently of the others, by means that are not illustrated in the figure. Such a hollow architecture makes it possible to obtain a lightweight optical system 300. M11 is arranged to collect and reflect rays of the pixelized light beam emitted by the pixelized light source 322. Since the structure of the optical system is open, no obturating element hinders this collection. M12 is arranged to reflect the rays reflected by M11; and M13 is arranged to receive these rays, to perform a collimation and to project the pixelized light beam 360. The third mirror M13 is arranged to perform a collimation of the pixelized light beam 360 and to project it onto the road.

In a second configuration shown in perspective in FIG. 4 and along a plane of vertical symmetry in FIG. 5, the optical system 400 in contrast has a monolithic architecture. The mirrors M11, M12 and M13 form a single part 402, i.e. a part of integral construction. This makes it possible to prevent the mirrors from drifting out of adjustment with respect to each other, and thus to achieve an initial adjustment (for example, a factory adjustment) that remains stable.

The single part 402 may be made from a transparent material equipped with aluminum-coated reflective faces forming one, a plurality or all of the mirrors M11, M12 and M13. This makes it possible to make manufacture simple, because there is no need to take into account the arrangement of the walls of 402 encountered on the path of the light rays. The manufacture may have as manufacturing constraint only the arrangement of the aluminum-coated reflective faces forming the mirrors M11, M12 and M13.

In this second configuration, the optical system 400 comprises an entrance face 582 and an exit face 584. The pixelized light beam emitted by the pixelized light source 522 enters via the entrance face 582 and is reflected by the mirrors M11, M12, and M13 and the exit face 584 performs a collimation of the rays and projects the pixelized light beam onto the road. The entrance face 582 and the exit face 584 may, either one of the two or both, be arranged to correct field aberrations. This improves overall performance.

It is possible to design an optical system suitable for a luminous motor-vehicle device according to any one of the examples and/or any one of the configurations described above, for example on the basis of designs well known in the field of TMAs (for example such as described in the aforementioned document US 2012038812 A), while setting as constraints the following specifications of the optical system: a projection-field height (i.e. maximum angle of the pixelized light beam projected in a vertical plane) larger than 10° (for example +/−5°, the symbol "+/−" being with respect to the central direction), a projection-field width (i.e. maximum angle of the pixelized light beam projected in a horizontal plane) larger than 40° (for example)+/−20°, a collecting power (i.e. an f/D) lower than 3, a resolving power lower than 0.5° (at least in a zone at the center of the projection field), and a largest dimension (i.e. an outside dimension) of the optical system smaller than 300 mm. The largest dimension may be the length of the smallest theoretical parallelepiped able to contain the optical system (for example the height H for the optical system 400 of FIG. 5).

This makes it possible to obtain an optical system that has dimensions suitable for allowing it to be integrated into a luminous motor-vehicle device and that ensures a good quality projection of a pixelized light beam emitted by a pixelized light source of the luminous device, even when the pixelized light source is high-resolution and the light beam contains details fully using the maximum resolution. Specifically, a resolving power lower than 0.5° and an f/D lower than 3 are relatively low specifications with respect to the optical systems of TMAs but that are good enough for the targeted application. The fact that the specifications are not more constraining allows the projection-field and dimensional constraints of the targeted application to be met.

It is possible to further improve quality by adding one or more of the following constraints: a projection-field height of about +/−15° or more, a projection-field width of about +/−40° or more, a resolving power higher than 0.15° for all of the projection field, a resolving power higher than or of about 0.08° in a zone at the center of the projection field, an f/D of about 0.8, and/or dimensions of about 100×100×250 millimeters.

By way of comparison, the optical system 102 of the TMA of FIG. 1 may have: a field of view of +/−0.85° width and of +/−0.3° height, a resolving power of about 0.00005°, an f/D of about 24, and, to meet these constraints, a largest dimension of several meters. Therefore, a TMA of these dimensions is unsuitable for the projection of pixelized light beams by a luminous device in an automotive context.

FIG. 6 shows simulations carried out on the basis of the above specifications. For each result, a geometric scatterplot of rays represents the performance of the optical system. As may be seen, the resolution of the projected image is about 2 milli-rad=0.1° for a total field of 0.45 rad×1.4 rad=25°×80°. This shows that the proposed optical system is indeed suitable for projection of high-resolution pixelized light beam.

The results of FIG. 6 also make it possible to see that the optical system may have distortion aberrations (sometimes of about 30%). Since it is not associated with haze but a deformation of the image, this type of aberration may be compensated for digitally (even when it is for example of about 30%) by modifying the shape of the pattern to be projected, emitted by the source.

FIG. 7 shows an example of a method for projection of a pixelized light beam by a luminous device such as described above that allows this digital compensation to be made.

The method comprises provision S10 of a setpoint for the distribution (i.e. map) of light to be produced by the projection of the pixelized light beam. In other words, a light beam that will produce the desired temporal and/or spatial distribution of the luminance values on the scene is requested, for example via the control unit of the pixelized source.

Figure 8:
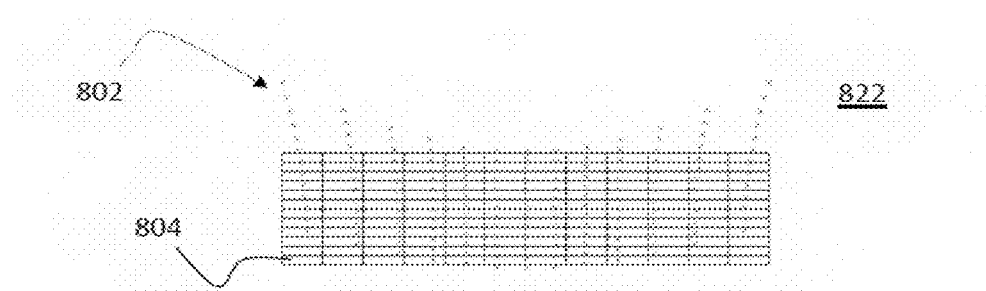
FIG. 8 illustrates the method.

The method then comprises, determination, for example by the control unit, of a distribution of light intensities over the pixelized light source corresponding to the setpoint and compensating for a distortion of the distribution of light by the optical system. In other words, the control unit determines what spatial and/or temporal distribution of light intensities (over the pixelized source) it must request in order to achieve the requested distribution of light over the scene. However, instead of achieving this by calculating a perfect inverse of the projection of a luminous pixel, the control unit takes into account the distortion of the optical system in the calculation. In particular, to establish the correspondence between a pixel of the scene and a pixel of the light source, the control unit takes into account one or more distortion parameters. For example, the method may use a nominal distortion of the optical system and produce an opposite deformation. This compensation is illustrated in FIG. 8 which shows the projection 804 of a rectangular grid of pixels of a scene onto a pixelized light source 822 without taking into account distortion. By taking into account the projection, the control unit calculates that it must request the distribution 802 of light intensity rather than a distribution corresponding to the projection 804.

The control unit may then control the emission S30 by the pixelized light source of a pixelized light beam having the determined distribution of light intensities. Thus, the optical system projects S40 the pixelized light beam emitted by the light source, with a distortion that was provided for in the calculations and that therefore leads to a good image.

Figure 9:
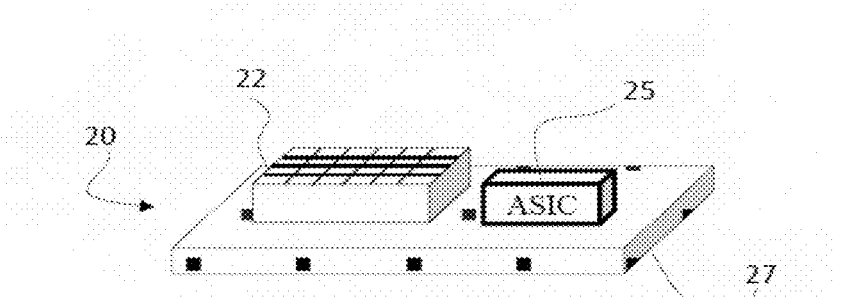
FIG. 9 shows a schematic example of a luminous module comprising a pixelized light source.

FIG. 9 shows a schematic example of a luminous module comprising a pixelized light source. The luminous device may comprise such a luminous module. The luminous module 20 comprises the high-density monolithic electroluminescent source 22, a printed circuit board or PCB 25 that holds the source 22 and a control unit 27 that controls the electroluminescent elements of the monolithic light source 22. Any holder other than a PCB may be envisioned. The control unit 27 may be in any other location, even outside of the luminous module 20. The control unit 27 shown is an ASIC, but other types of control unit may implement the functions of the luminous module.

Figure 10:
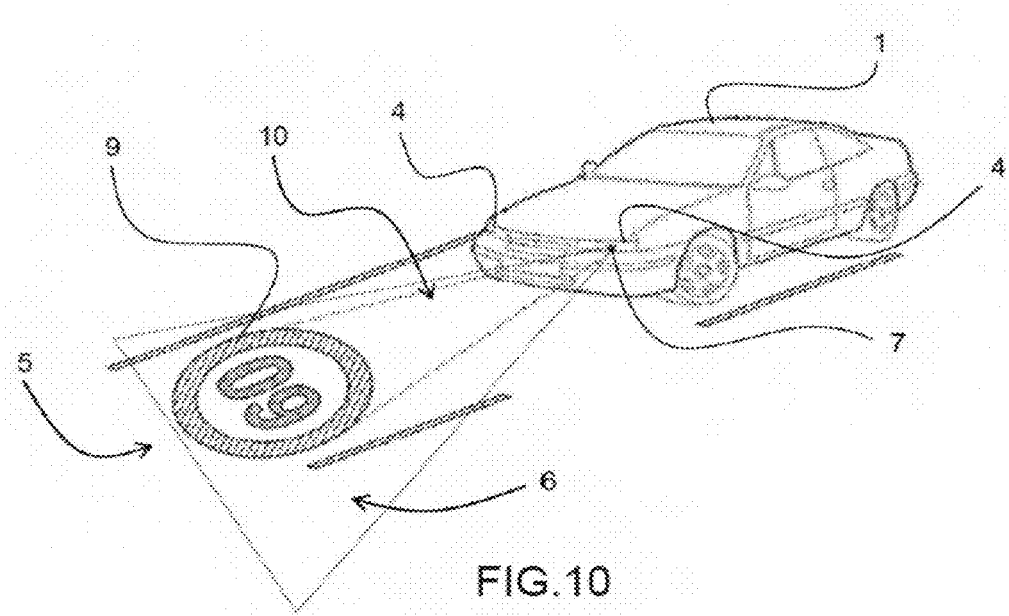
FIG. 10 shows a schematic example of projection of a pixelized light beam by a vehicle.

FIG. 10 shows a schematic example of projection of a pixelized light beam by a vehicle, seen in perspective. The motor vehicle 1 is equipped with two lights 4 one or each of which comprises at least one luminous device 7 configured to each project a pixelized light beam 10 onto a scene 5 located in front of the vehicle 1. The pixelized light beam 10 is in the example configured to form an overall illumination 6. The overall illumination 6 may be subject to regulations. The pixelized light beam 10 is also configured to form the pattern 9. The illuminance of the pattern 9 is also subject to regulations. In the example, it is higher than the illuminance of the first segment 9 therearound, this allowing it to be made visible via positive contrast. The pattern 9 is in the example an image containing driver-assisting symbolic and textual information. The image 9 in particular relates to the speed of the vehicle. The luminous device 7 may alternatively project signaling information or even information guiding the driver of the vehicle 1. The device 7 may also in other examples project other patterns.

The invention claimed is:

1. A motor vehicle light including a luminous device comprising:
a pixelized light source comprising a plurality of individual light source units each forming a corresponding individual pixel in a pixelized light beam;
an optical system that is arranged to project the pixelized light beam emitted by the pixelized light source such that the individual pixels are maintained, the optical system comprising:
a first mirror arranged to collect and reflect rays of the pixelized light beam emitted by the pixelized light source,
a second mirror arranged to reflect the rays reflected by the first mirror, and
a third mirror arranged to reflect the rays reflected by the second mirror so as to correct field aberrations.

2. The motor vehicle light according to claim 1, wherein the third mirror is also arranged to collimate and project the pixelized light beam.

3. The motor vehicle light according to claim 2, wherein the second mirror is arranged substantially in pupil position.

4. The motor vehicle light according to claim 2, wherein at least one of the mirrors is off-axis.

5. The motor vehicle light according to claim 2, wherein the optical system has a hollow architecture.

6. The motor vehicle light according to claim 2, wherein the optical system has a monolithic architecture.

7. The motor vehicle light according to claim 2, wherein the optical system has at least one of the following features:
a projection-field height larger than 10°,
a projection-field width larger than 40°,
a collecting power (f/D) lower than 3,
a resolving power lower than 0.5°, at least in a zone at the center of the projection field, and/or
a largest dimension (H) smaller than 300 millimeters.

8. The motor vehicle light according to claim 1, wherein the luminous device furthermore includes an optical means arranged to receive the rays reflected by the third mirror and to collimate and project the pixelized light beam.

9. The motor vehicle light according to claim 1, wherein the second mirror is arranged substantially in pupil position.

10. The motor vehicle light according to claim 1, wherein at least one of the mirrors is off-axis.

11. The motor vehicle light according to claim 10, wherein at least one of the mirrors is a free-form mirror.

12. The motor vehicle light according to claim 1, wherein the optical system has a hollow architecture.

13. The motor vehicle light according to claim 1, wherein the optical system has a monolithic architecture.

14. The motor vehicle light according to claim 13, wherein the optical system comprises an entrance face and an exit face.

15. The motor vehicle light according to claim 14, wherein the entrance face and/or the exit face is arranged to correct field aberrations.

16. The motor vehicle light according to claim 1, wherein the optical system has at least one of the following features:
a projection-field height larger than 10°,
a projection-field width larger than 40°,
a collecting power (f/D) lower than 3,
a resolving power lower than 0.5°, at least in a zone at the center of the projection field, and/or
a largest dimension (H) smaller than 300 millimeters.

17. A luminous device for a motor vehicle, said device including a pixelized light source and an optical system that is arranged to project a pixelized light beam emitted by the pixelized light source, the optical system comprising:
a first mirror arranged to collect and reflect rays of the pixelized light beam emitted by the pixelized light source,
a second mirror arranged to reflect the rays reflected by the first mirror, and
a third mirror arranged to reflect the rays reflected by the second mirror so as to correct field aberrations; and
a control unit including a processor associated with a memory storing a computer program comprising program-code instructions for the execution of a method comprising:
provision of a setpoint for the distribution of light to be produced by the projection of the pixelized light beam;
determination of a distribution of light intensities over the pixelized light source corresponding to the setpoint and compensating for a distortion of the distribution of light by the optical system;
emission, by the pixelized light source, of a pixelized light beam having the determined distribution of light intensities; and
projection, by the optical system, of the pixelized light beam emitted by the light source.

18. A method for projection of a pixelized light beam by a luminous device for a motor vehicle, said device including a pixelized light source and an optical system that is arranged to project a pixelized light beam emitted by the pixelized light source, the optical system comprising a first mirror arranged to collect and reflect rays of the pixelized light beam emitted by the pixelized light source, a second mirror arranged to reflect the rays reflected by the first mirror, and a third mirror arranged to reflect the rays reflected by the second mirror so as to correct field aberrations, wherein the method comprising:
provision of a setpoint for the distribution of light to be produced by the projection of the pixelized light beam;
determination of a distribution of light intensities over the pixelized light source corresponding to the setpoint and compensating for a distortion of the distribution of light by the optical system;
emission, by the pixelized light source, of a pixelized light beam having the determined distribution of light intensities; and
projection, by the optical system, of the pixelized light beam emitted by the light source.

19. A computer program comprising program-code instructions for the execution of the method according to claim 18 when said program is executed by a control unit for controlling projection of a pixelized light beam by a luminous motor-vehicle device including a pixelized light source, the control unit coupled to the pixelized light source, and an optical system arranged to project a pixelized light beam emitted by the pixelized light source.

* * * * *